(12) United States Patent
Chen (10) Patent No.: US 10,501,963 B1
(45) Date of Patent: Dec. 10, 2019

(54) LOCKING DEVICE

(71) Applicant: NANNING FUGUI PRECISION INDUSTRIAL CO., LTD., Nanning (CN)

(72) Inventor: I-An Chen, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/222,024

(22) Filed: Dec. 17, 2018

(51) Int. Cl.
*E05B 63/00* (2006.01)
*E05B 63/02* (2006.01)
*E05B 65/00* (2006.01)
*F16L 37/08* (2006.01)
*B23Q 1/00* (2006.01)
*B23Q 1/01* (2006.01)

(52) U.S. Cl.
CPC .......... *E05B 63/0056* (2013.01); *B23Q 1/015* (2013.01); *E05B 63/02* (2013.01); *E05B 65/006* (2013.01); *E05B 2063/0039* (2013.01)

(58) Field of Classification Search
CPC .... E05B 63/0056; E05B 63/02; E05B 65/006; E05B 2063/0039; B23Q 1/015
See application file for complete search history.

(56) References Cited

U.S. PATENT DOCUMENTS

| | | | | |
|---|---|---|---|---|
| 5,160,180 A | * | 11/1992 | Mlynarczyk | E05B 5/003 292/251 |
| 5,530,999 A | * | 7/1996 | Barnes | F16B 21/165 24/573.11 |
| 6,131,642 A | * | 10/2000 | Welfonder | E06B 9/90 160/301 |
| 6,519,980 B1 | * | 2/2003 | Walker | D04B 35/00 66/147 |
| 7,578,478 B2 | * | 8/2009 | Guard | B64C 1/066 244/131 |
| 7,913,963 B2 | * | 3/2011 | Cheng | B60R 11/02 248/205.5 |
| 9,027,969 B2 | * | 5/2015 | Lin | F16L 37/084 285/361 |
| 2017/0122004 A1 | * | 5/2017 | Calamia, III | E05B 65/0007 |

\* cited by examiner

*Primary Examiner* — Tan Le
(74) *Attorney, Agent, or Firm* — ScienBiziP, P.C.

(57) ABSTRACT

A device for locking a machine or other movable device in place includes a supporting mechanism, two locking members, and a pushing mechanism. The pushing mechanism includes a sleeve, a driving member, a pushing member, a driven member, and locating members. At least one first guiding opening and at least one second guiding opening are defined on the sleeve. A first surface is defined on the driving member. A second surface is defined on the driven member. The driving member moves the driven member. The driven member rotates under interaction of the first and second surfaces. The driven member drives a free end of each locating member to move. The driven member drives the pushing member to lever free ends of the two locking members apart or moves the pushing member to bring the free ends of the two locking members closer.

20 Claims, 6 Drawing Sheets

LOCKING DEVICE

FIELD

The subject matter herein generally relates to a locking device.

BACKGROUND

At present, a locking member is generally used to fasten a machine to a plate of a cabinet to prevent the machine from sliding out of the cabinet. The locking member can be a passive elastic piece. When the machine is pushed into the cabinet, the locking member is deformed out of the way by the machine. When the machine is pushed to a predetermined position, the locking member is restored and partially received into a groove of the machine to fasten the machine. The locking member can be a cam latch, and the locking member is clamped into a slot of the machine by rotating a cam of the locking member to fix the machine.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
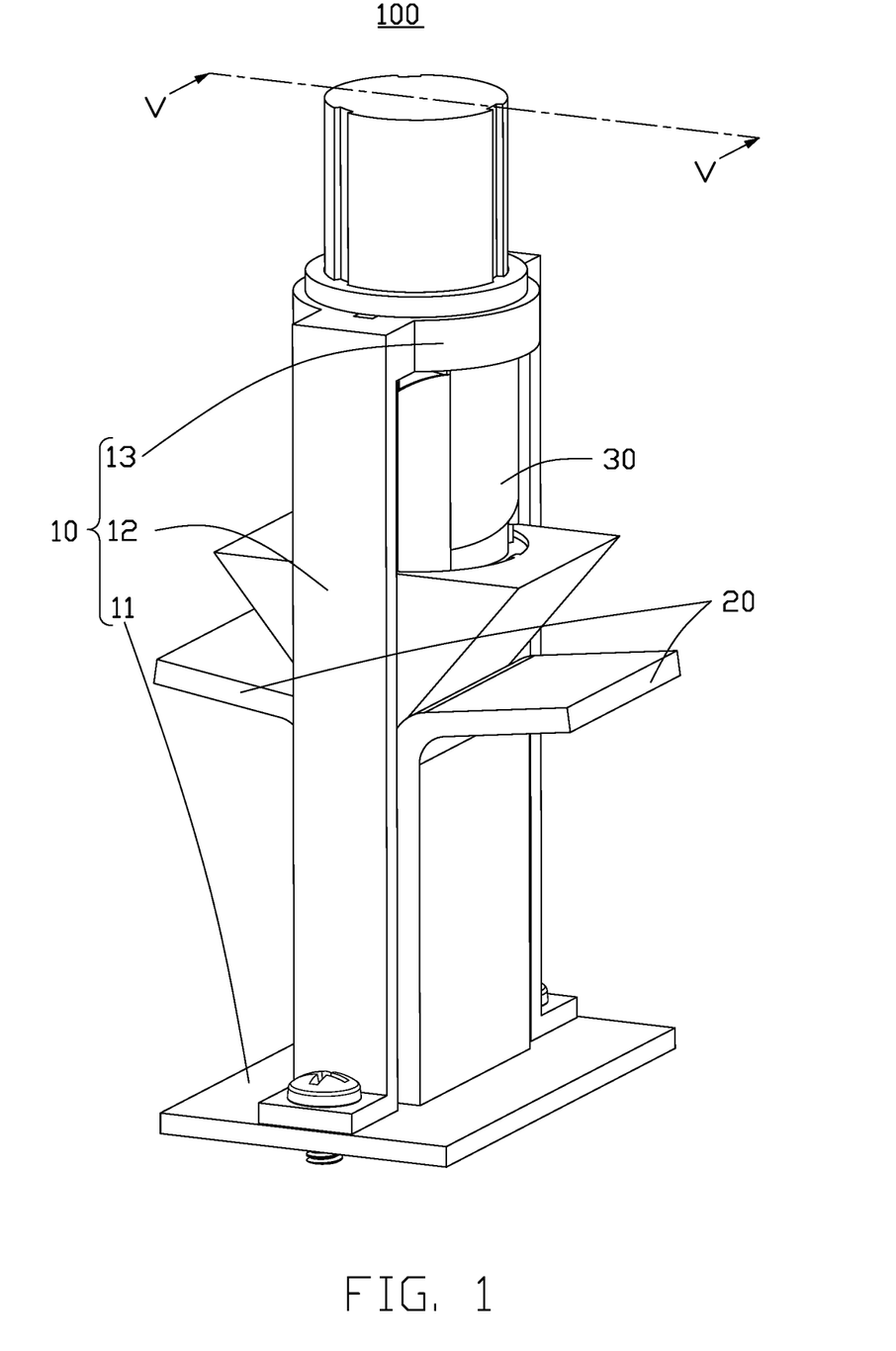
FIG. 1 is an isometric view of a locking device of an embodiment of this disclosure.

FIG. 1 illustrates a locking device 100 configured to lock and fasten a machine (not shown in FIG. 1). The locking device 100 can include a supporting mechanism 10, two locking members 20, and a pushing mechanism 30. The supporting mechanism 10 can be positioned on a cabinet (not shown in FIG. 1) adjacent to a slot of the machine. The pushing mechanism 30 and the two locking members 20 can be positioned on the supporting mechanism 10. The pushing mechanism 30 can drive each of the two locking members 20 to partially latch into the slot of the machine to lock the machine.

The supporting mechanism 10 can include a bottom plate 11, two supporting members 12, and a fastening sleeve 13. The bottom plate 11 can be substantially rectangular. The bottom plate 11 can be configured to connect to the cabinet. Two supporting members 12 can be positioned on the bottom plate 11 adjacent to opposing ends of the bottom plate 11. Each supporting member 12 can be substantially plate-like. The fastening sleeve 13 can be connected to an end of each supporting member 12 away from the bottom plate 11 and located between the two supporting members 12.

Figure 2:
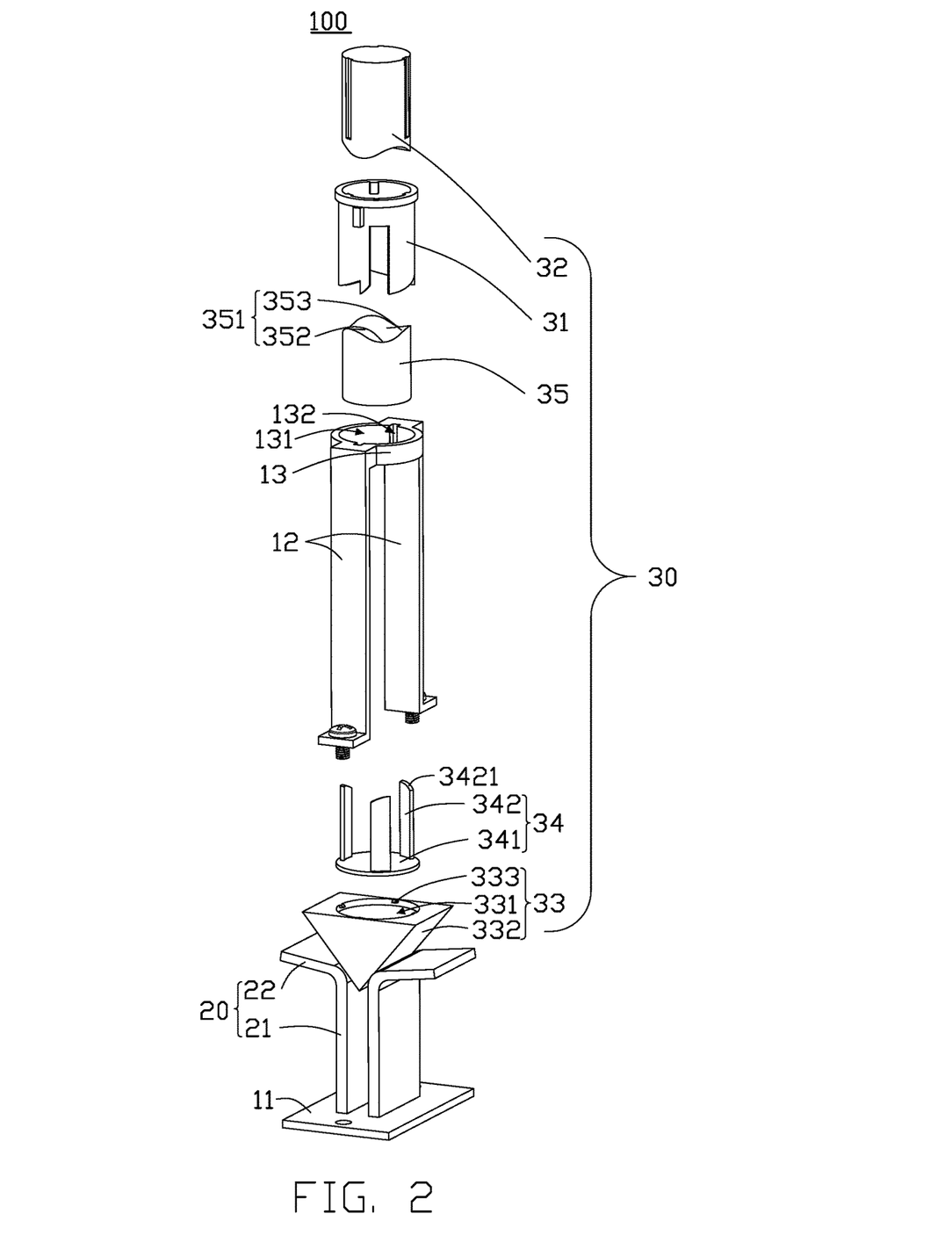
FIG. 2 is an exploded, isometric view of the locking device shown in FIG. 1.

Referring to FIG. 2, a mounting hole 131 and at least one limiting groove 132 can be defined on the fastening sleeve 13. The mounting hole 131 can pass through opposing ends of the fastening sleeve 13. The at least one limiting groove 132 can be defined on an inner surface (not labeled) of the mounting hole 131 and pass through opposing ends of the fastening sleeve 13. In this embodiment, one end of each supporting member 12 can be fastened to the bottom plate 11 by a screw (not labeled).

The two locking members 20 located between the two supporting members 12 can be spaced apart from each other on the bottom plate 11. Each of the locking members 20 can be substantially L-shaped. Each locking member 20 can include a main body 21 and a locking portion 22. The main body 21 can be a substantially elongated plate. An end of the main body 21 can be positioned on the bottom plate 11. The locking portion 22 can be positioned on an end of the main body 21 away from the bottom plate 11. The locking portions 22 of the two locking members 20 face away from each other. The locking portion 22 can be received into a slot of a machine (not shown in FIG. 1). In this embodiment, the locking portion 22 can be formed by bending one end of the main body 21 along a direction away from a side of the main body 21.

The pushing mechanism 30 includes a sleeve 31, a driving member 32, a pushing member 33, a fastening bracket 34, and a driven member 35.

Figure 3:
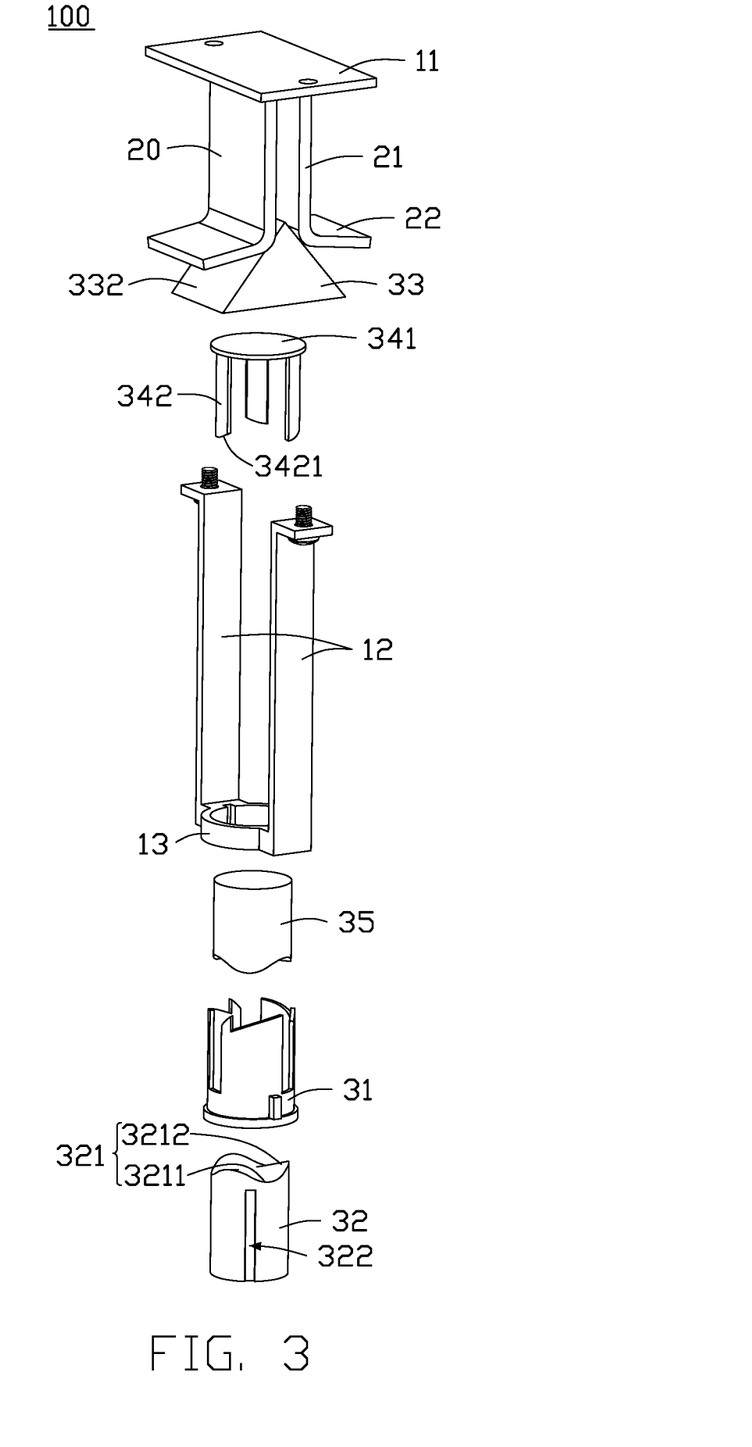
FIG. 3 is similar to FIG. 2, but viewed from another angle.
Figure 4:
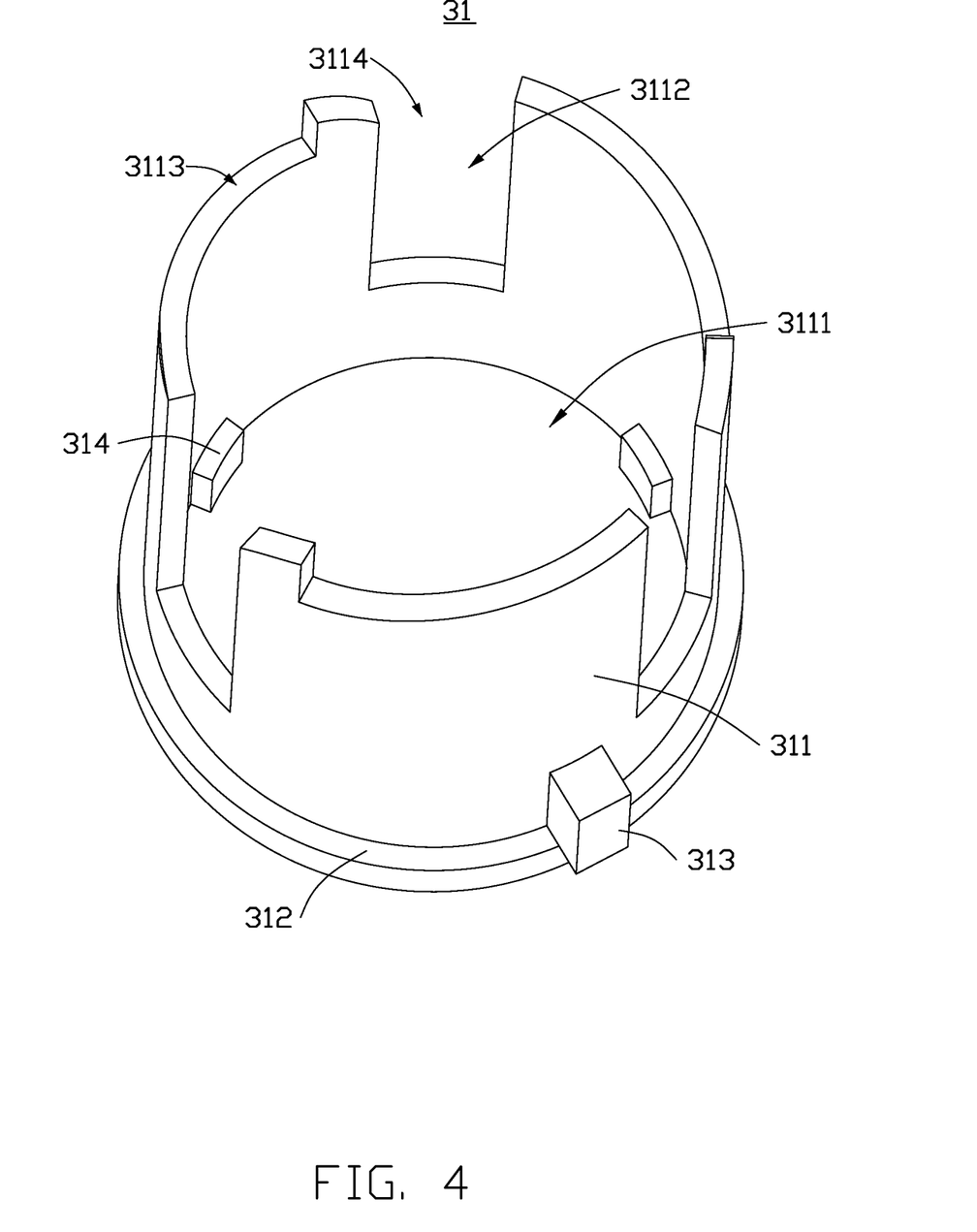
FIG. 4 is an isometric view of a sleeve of the locking device shown in FIG. 2.
Figure 5:
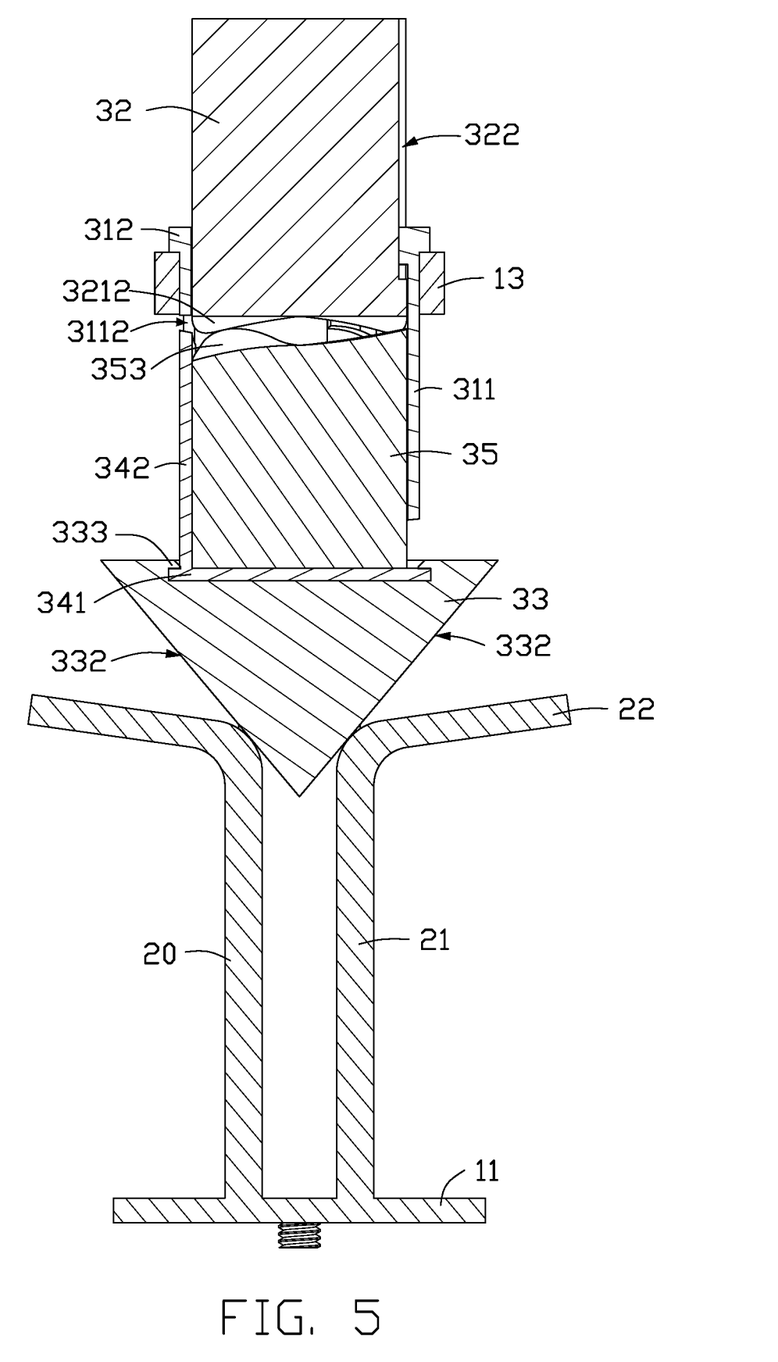
FIG. 5 is a cross-sectional view along line V-V of FIG. 1.

Referring to FIG. 3 and FIG. 4, the sleeve 31 can be substantially hollow and is cylindrical. The sleeve 31 can include a sleeve body 311, a stopper portion 312, at least one limiting protrusion 313, and at least one first guiding portion 314. The sleeve body 311 can be partially received in the mounting hole 131 of the fastening sleeve 13. A through hole 3111, at least one first guiding opening 3112 and at least one second guiding opening 3113 can be defined in the sleeve body 311. The through hole 3111 can pass through opposing ends of the sleeve body 311. Each of the at least one first guiding opening 3112 can be defined on an end of the sleeve body 311 and extend along an axial direction of the sleeve body 311. Each of the at least one second guiding opening 3113 can be an arcuate opening. Each of the at least one second guiding opening 3113 can be defined on the end of the sleeve body 311 and can communicate with the first guiding opening 3112. A depth of each of the at least one second guide opening 3113 can be increased along a circumferential direction of the sleeve body 311. In this embodiment, each of the at least one first guiding opening 3112 is a strip-shaped open.

In at least one embodiment, a plurality of first guiding openings 3112 and a plurality of second guiding openings 3113 can be defined in the sleeve body 311. The plurality of first guiding openings 3112 and the plurality of second guiding openings 3113 can be arranged to alternate along a circumferential direction of the sleeve body 311. Each first guiding opening 3112 can include an opening end 3114. Each second guiding opening 3113 can be located between the two adjacent first guiding openings 3112. An end of each second guiding opening 3113 can communicate with the opening end 3114 of one of the two adjacent first guiding openings 3112, and the other end of each second guiding opening 3113 can be separated from the other one of the two adjacent first guiding openings 3112. In this embodiment, there are three first guiding openings 3112 and three second guiding openings 3113.

The stopper portion 312 can be positioned on an end of the sleeve body 311. The stopper portion 312 can abut against the fastening sleeve 13 to prevent the sleeve body 311 from dropping out of the fastening sleeve 13. Each limiting protrusion 313 can be positioned on an outer peripheral wall (not labeled) of the sleeve body 311 and can be received in a limiting groove 132 to prevent the sleeve body 311 from rotating relative to the fastening sleeve 13. Each of the at least one first guiding portions 314 can be positioned on an inner peripheral wall (not labeled) of the sleeve body 311 and adjacent to an end of the sleeve body 311 having the stopper portion 312. In this embodiment, each of the first at least one guiding portion 314 can be a block-shaped protrusion.

The driving member 32 can be substantially cylindrical. The driving member 32 can be partially slidably received in the through hole 3111 of the sleeve body 311. A first surface 321 can be defined on an end of the driving member 32 facing the bottom plate 11. The first surface 321 can include a plurality of first concave surfaces 3211 and a plurality of first convex surfaces 3212. Both the first concave surface 3211 and the first convex surface 3212 can be substantially fan-shaped. The plurality of first concave surfaces 3211 and the plurality of first convex surfaces 3212 can alternate along a circumferential direction of the driving member 32 for smooth transitions. The transition to the next first concave surface 3211 and the next first convex surface 3212 can thus be smooth.

At least one second guiding portion 322 can be defined on the driving member 32. In this embodiment, each of the at least one second guiding portion 322 can be a strip-shaped groove. The at least one second guiding portion 322 can be defined on a peripheral wall (not labeled) of the driving member 32 and extend through an end of the driving member 32 first concave-convex surface 321. Each of the at least one second guiding portion 322 can receive the first guiding portion 314 to guide the driving member 32.

The pushing member 33 can be placed on the two locking members 20, and a portion of the pushing member 33 can be located between the two locking members 20. The pushing member 33 can be substantially triangular. The pushing member 33 can include a receiving groove 331, two pushing surfaces 332, and at least two clasps 333. The receiving groove 331 can be defined on a side surface (not labeled) of the pushing member 33. The two pushing surfaces 332 can be defined on opposite sides of the pushing member 33. Each of the two pushing faces 332 can abut against an end of the main body 21 of the locking member 20. Each of the two pushing surfaces 332 can push the main body 21 of the locking member 20 to deform the main body 21. Each of the two pushing surfaces 332 can drive the pushing member 33 away from the bottom plate 11 by a resilient force of the main body 21 of the locking member 20. The at least two clasps 333 can be evenly positioned on a peripheral wall of the receiving groove 331 along a circumferential direction of the receiving groove 331. In this embodiment, the receiving groove 331 can be a circular groove.

The fastening bracket 34 can be rotatably positioned in the receiving groove 331 of the pushing member 33. The fastening bracket 34 can include a fastening plate 341 and at least one locating member 342. The fastening plate 341 can be substantially circular. The fastening plate 341 can be rotatably positioned in the receiving groove 331 of the pushing member 33, and a periphery (not labeled) of the fastening plate 341 can abut against the at least two clasps 333 to prevent the fastening plate 341 moving out of the receiving groove 331. Each of the at least one locating members 342 can be positioned on a side of the fastening plate 341 facing away from the pushing member 33. Each of the at least one locating members 342 can be substantially an elongated plate. An oblique plane 3421 can be defined on an end of each locating member 342 away from the fastening plate 341. The oblique plane 3421 can slidably abut against an edge (not labeled) of the second guiding opening 3113. Each locating member 342 can be slidably received in the first guiding opening 3112. Each of the at least one locating member 342 can be separated from the first guiding opening 3112 and partially move into the second guiding opening 3113. In this embodiment, there are three locating members 342, and the three locating members 342 can be evenly arranged along the circumferential direction of the fastening plate 341.

The driven member 35 can be substantially cylindrical. The driven member 35 can be positioned on a side of the fastening plate 341 of the fastening bracket 34 facing away from the pushing member 33. Referring to FIG. 2, a second surface 351 can be defined on an end surface of the driven member 35 facing away from the fastening plate 341. The second surface 351 can include a plurality of second concave surfaces 352 and a plurality of second convex surfaces 353. Each second concave surface 352 and each second convex surface 353 can be substantially fan-shaped. The plurality of second concave surfaces 352 and the plurality of second convex surfaces 353 can alternate along the circumferential direction of the driven member 35 for smooth transitions. Each second concave surface 352 can engage with each first convex surface 3212. Each second convex face 353 can engage with each first concave face 3211.

In use, referring to FIG. 1 through FIG. 6, the driving member 32 is continuously pressed and moves along the sleeve 31 toward the pushing member 33. Each first convex surface 3212 of the driving member 32 abuts against the second convex surface 353 of the driven member 35 to move the driven member 35 straight toward the pushing member 33. The two pushing surfaces 332 of the pushing member 33 push against the main body 21 of the two locking members 20 and elastically deform it, thus the locking portion 22 gradually extends into a slot of a machine (not shown). During the movement of the driven member 35, since Each locating member 342 moves within the first guiding opening 3112, the driven member 35 does not rotate. When one end of Each locating member 342 moves into the second guiding opening 3113, since each first convex surface 3212 of the driving member 32 resists against the second convex surface 353 of the driven member 35, the driven member 35 is rotated.

Figure 6:
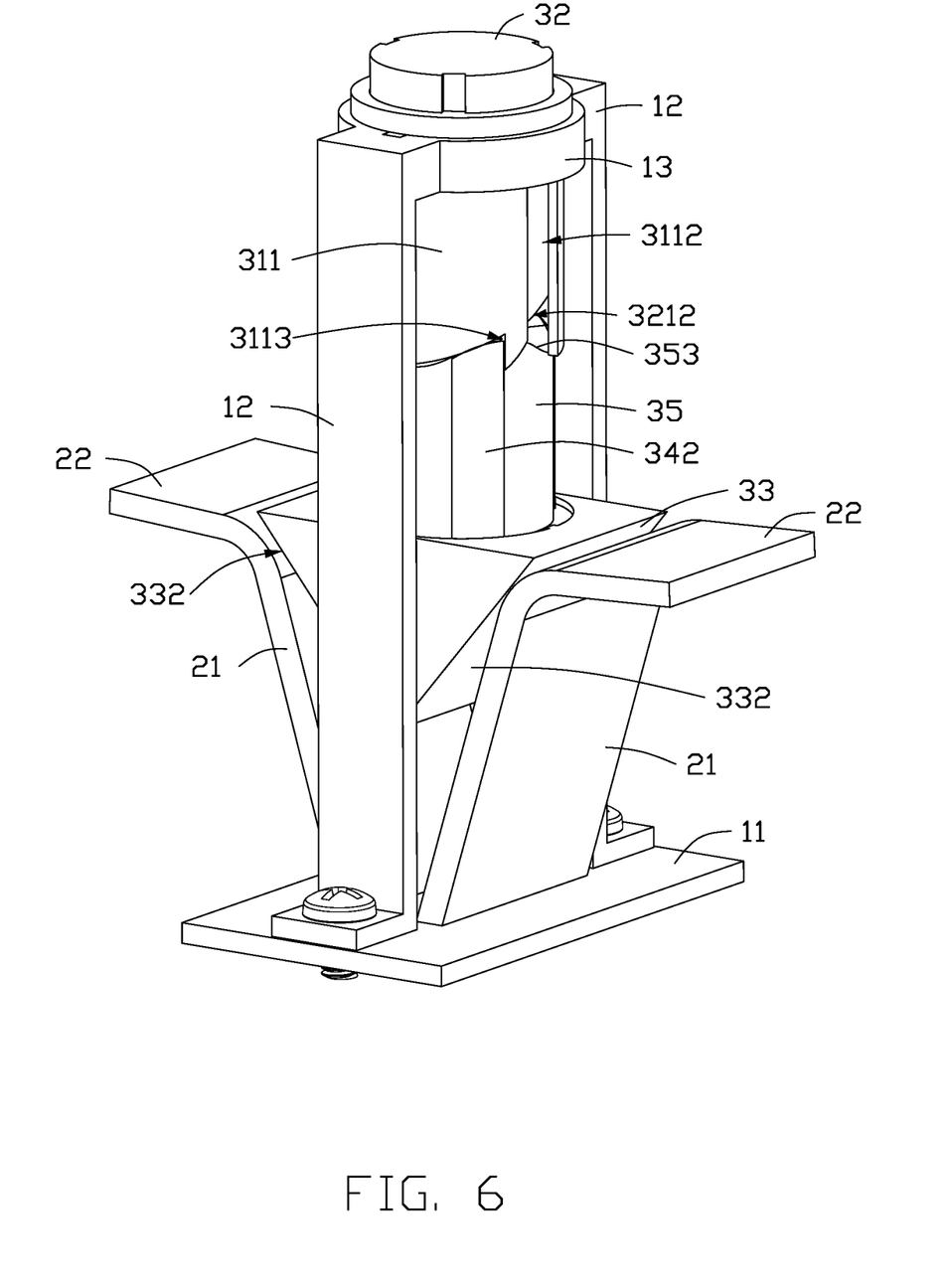
FIG. 6 is an isometric view of the locking device of FIG. 1 in locking state.

The rotating driven member 35 drives Each locating member 342 to rotate, thus a free end portion of Each locating member 342 enters into the second guiding opening 3113. Each first convex surface 3212 gradually engages with the second concave surface 352. Each first concave surface 3211 gradually engages with the second convex surface 353. The pressing of the driving member 32 is cancelled. Simultaneously, under the resilient force of the two locking members 20, each of the two locking members 20 pushes against the pushing surface 332 to move the pushing member 33 far away from the two locking members 20. The pushing member 33 drives the free end of each locating member 342 to move along the second guiding opening 3113 until the free end of each locating member 342 resists against an end of the second guiding opening 3113. The locking portion 22 of each of the two locking members 20 is thus sustainably latched in the card slot of the machine (not shown). In addition, each locating member 342 rotates under the guidance of the second guiding opening 3113. Each locating member 342 drives the driven member 35 to rotate at a predetermined angle, and each second convex surface 353 resists against the first convex surface 3212.

Pressing the driving member 32 again, each first convex surface 3212 pushes and resists against the second convex surface 353 to drive the driven member 35 to rotate. The driven member 35 drives the free end of each locating member 342 into the first guiding opening 3112 from the second guiding opening 3113. The pressing of the driving member 32 is cancelled. Under the resilient force of the two locking members 20, each of the two locking members 20 pushes against the pushing surface 332 to move the pushing member 33 far away from the two locking members 20. The pushing member 33 drives the free end of Each locating member 342 to move along the first guiding opening 3112, thus the driven member 35 moves far away from the two locking members 20. The locking portion 22 of each of the two locking members 20 is thus disengaged from the slot of the machine (not shown) to release the machine.

In at least one embodiment, the stopper portion 312 and the at least one limiting protrusion 313 of the sleeve 31 can be omitted, the sleeve body 311 can be fixedly positioned in the fastening sleeve 13.

In at least one embodiment, each of the at least one first guiding portion 314 can also be a strip-shaped groove, and each of the at least one second guiding portion 322 can also be a block-shaped protrusion. Each of the at least one second guiding portion 322 can be slidably received in the first guiding portion 314.

In at least one embodiment, the at least one first guiding portion 314 and the at least one second guiding portion 322 can be omitted, and the driving member 32 can also have a polygonal prism shape rather than a cylindrical shape. The through hole 3111 of the sleeve 31 can also be a prismatic hole rather than the cylindrical hole, to engage with a peripheral wall of the driving member 32. Thereby, the driving member 32 can only move along an axial direction of the sleeve 31.

In at least one embodiment, the fastening plate 341 of the fastening bracket 34 can be omitted, the at least one locating member 342 can be positioned on a peripheral wall of the driven member 35 directly. It can be understood that the at least one locating member 342 can be integrally formed with the driven member 35, and an end of the driven member 35 can be rotatably positioned on the pushing member 33 directly.

The embodiments shown and described above are only examples. Many details are often found in the art such as the other features of a locking device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A locking device used to lock a machine, the locking device comprising:
   a supporting mechanism;
   two locking members positioned on the supporting mechanism and distant from each other, and
   a pushing mechanism comprising:
      a sleeve positioned on the supporting mechanism and facing the two locking members, the sleeve comprising a sleeve body having a through hole, at least one first guiding opening and at least one second guiding opening;
      a driving member slidably and partially positioned in the through hole, and having a first surface on an end thereof;
      a pushing member placed on the two locking members and partially located between the two locking members, two pushing surfaces being defined on the pushing member and abutting against free ends of the two locking members respectively;
      a driven member rotatably positioned on the pushing member, a second surface being defined on an end surface of the driven member; and
      at least one locating member positioned on a peripheral wall of the driven member;
   wherein each of the at least one first guiding opening is defined on an end of the sleeve body and extends along an axial direction of the sleeve body, and each of the at least one second guiding opening is defined on the end of the sleeve body and communicates with the first guiding opening; and
   wherein the driving member moves the driven member, the driven member rotates at a predetermined angle under an interaction of the first surface and the second surface,
   the rotating driven member drives a free end of each of the at least one locating member to move from the first guiding opening into the second guiding opening or from the second guiding opening into the first guiding opening, the rotating driven member drives the pushing member to push free ends of the two locking members apart from each other or moves the pushing member far away from the two locking members to make the free ends of the two locking members close to each other.

2. The locking device of claim 1, wherein the first surface comprises a plurality of first concave surfaces and a plurality of first convex surfaces, the plurality of first concave surfaces and the plurality of first convex surfaces alternate along a circumferential direction of the driving member for smooth transitions.

3. The locking device of claim 2, wherein the second surface comprises a plurality of second concave surfaces and a plurality of second convex surfaces, the plurality of second concave surfaces and the plurality of second convex surfaces alternate along the circumferential direction of the driven member for smooth transitions, each second concave surface engages with each first convex surface, and each second convex face engages with each first concave face.

4. The locking device of claim 3, wherein each first concave surface and each first convex surface are fan-shaped, and each second concave surface and each second convex surface are fan-shaped.

5. The locking device of claim 1, wherein the sleeve comprises at least one first guiding portion, each of the at least one first guiding portion is positioned on an inner peripheral wall of the sleeve body, at least one second guiding portion is defined on a peripheral wall of the driving member, and each of the at least one second guiding portion receives the first guiding portion to guide the driving member.

6. The locking device of claim 5, wherein one of the at least one first guiding portions and at least one second guiding portion is block-shaped protrusion, and the other one of the at least one first guiding portions and at least one second guiding portion is a strip-shaped groove.

7. The locking device of claim 1, wherein the driving member has a polygonal prism shape rather than a cylindrical shape, and the through hole of the sleeve is a prismatic hole rather than the cylindrical hole to engage with a peripheral wall of the driving member.

8. The locking device of claim 1, wherein a plurality of first guiding openings and a plurality of second guiding openings are defined in the sleeve body, the plurality of first guiding openings and the plurality of second guiding openings alternate along a circumferential direction of the sleeve body, each first guiding opening comprises an opening end, each second guiding opening is located between the two adjacent first guiding openings, an end of each second guiding opening communicates with the opening end of one of the two adjacent first guiding openings, and the other end of each second guiding opening is separated from the other one of the two adjacent first guiding openings.

9. The locking device of claim 1, wherein each of the at least one first guiding opening is a strip-shaped open.

10. The locking device of claim 1, wherein each of the at least one second guiding opening is an arcuate open.

11. The locking device of claim 10, wherein a depth of each of the at least one second guide opening is increased along a circumferential direction of the sleeve body.

12. The locking device of claim 1, wherein the supporting mechanism comprises a bottom plate, two supporting members and a fastening sleeve, the bottom plate is configured to connect to a cabinet, two supporting members are positioned on the bottom plate and respectively adjacent to two ends of the bottom plate, the fastening sleeve is connected to an end of each supporting member away from the bottom plate and located between the two supporting members, a mounting hole is defined on the fastening sleeve, the mounting hole passes through both ends of the fastening sleeve, the sleeve body is partially received in the mounting hole of the fastening sleeve, and the two locking members located between the two supporting member are spaced apart from each other on the bottom plate located between the two supporting member.

13. The locking device of claim 12, wherein the bottom plate is rectangular, each supporting member is plate-like.

14. The locking device of claim 12, wherein at least one limiting groove is defined on the fastening sleeve, the at least one limiting groove is defined on an inner surface of the mounting hole and passes through both ends of the fastening sleeve, the sleeve further comprises at least one limiting protrusion, each of the at least one limiting protrusion is positioned on an outer peripheral wall of the sleeve body and received in the limiting groove to prevent the sleeve body from rotating relative to the fastening sleeve.

15. The locking device of claim 12, wherein each of the locking members comprises a main body and a locking portion, an end of the main body is positioned on the bottom plate, the locking portion is positioned on an end of the main body away from the bottom plate, and the locking portions of the two locking members face away from each other.

16. The locking device of claim 15, wherein each of the locking members is L-shaped, and the main body is an elongated plate.

17. The locking device of claim 12, wherein the sleeve further comprises a stopper portion, the stopper portion is positioned on an end of the sleeve body, and the stopper portion resists against the fastening sleeve.

18. The locking device of claim 1, wherein the pushing mechanism further comprises a fastening plate, the fastening plate is rotatably positioned on the pushing member, the at least one locating members and the driven member are positioned on a side of the fastening plate facing away from the pushing member.

19. The locking device of claim 18, wherein an oblique plane is defined on an end of each of the at least one locating member away from the fastening plate, the oblique plane slidably resists against an edge of the second guiding opening.

20. The locking device of claim 18, wherein the pushing member further comprises a receiving groove and at least two clasps, the receiving groove is defined on a side surface of the pushing member, the at least two clasps is evenly positioned on a peripheral wall of the receiving groove along a circumferential direction of the receiving groove, the fastening plate is rotatably positioned in the receiving groove, and a periphery of the fastening plate resists against the at least two clasps.

* * * * *